UNITED STATES PATENT OFFICE.

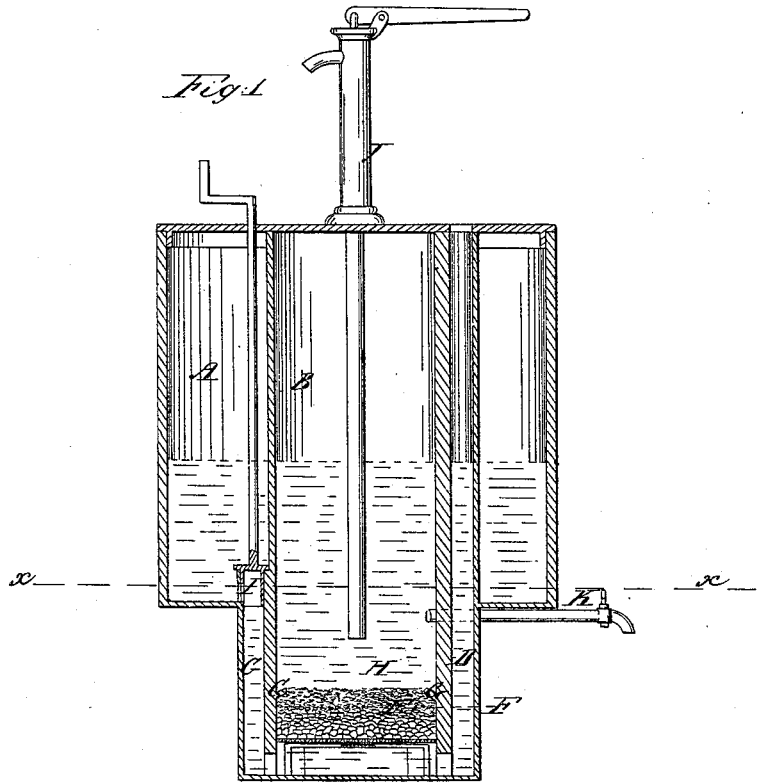
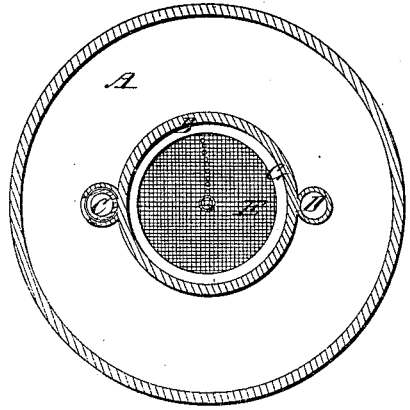

CHAPMAN WARNER, OF GREEN POINT, NEW YORK.

FILTER.

Specification of Letters Patent No. 15,027, dated June 3, 1856.

*To all whom it may concern:*

Be it known that I, CHAPMAN WARNER, of Greenpoint, in the county of Kings and State of New York, have invented a new and useful Improvement in the Construction of Cisterns, Vessels, or Reservoirs of Any Kind for Holding and Filtering Water; and I do hereby declare that the following is a full, clear, and exact description of the same, reference being had to the annexed drawings, making a part of this specification, in which—

Figure 1 is a vertical section of my improvement the plane of section being through the center. Fig. 2, is a horizontal section of ditto, (*x*), (*x*), Fig. 1 showing the plane of section.

Similar letters of reference indicate corresponding parts in the two figures.

My invention consists in having the cistern, vessel or reservoir, provided with an inner well or vessel, the lower part of which projects a certain distance below the bottom of the main cistern, or vessel and contains proper filtering materials. The lower part of the inner well or vessel communicates within the main cistern or vessel by means of a tube or passage which may be entirely or partially opened or fully closed by means of a valve or gate, said inner well or vessel also has a tube communicating with its lower part which tube as also the inner well or vessel is provided with a pump.

By the above construction as will be presently shown and described the water will pass from the main cistern or vessel into the inner well or vessel and through the filtering material and will be perfectly filtered, and the filtering material may be readily cleansed or removed and new or fresh material substituted without wasting the water.

To enable those skilled in the art to fully understand and construct my invention, I will proceed to describe it.

A, represents a cistern or vessel, which may be of cylindrical form and constructed of any proper material.

B, represents an inner well or vessel which may also be of cylindrical form and placed at the center of the cistern A, the well or vessel B, projecting below the bottom of the cistern or vessel A, as plainly shown in Fig. 1. The well or vessel B, extends upward as high as the cistern or vessel A and its lower part is connected to the lower part of the cistern A by a tube or passage C.

D, is a tube connected with the lower part of the well or vessel B, and extending upward as high as the well or vessel B. In the lower part of the well or vessel B, a screen or perforated plate E, is fitted on which a layer of pulverized charcoal F, is placed.

G, is an annular flanch secured to the inner side of the well or vessel B, just above the layer of charcoal F, said flanch projecting a short distance over the charcoal. Directly over the charcoal a layer of sand H, is placed.

I, is a gate or valve fitted in the upper part of the tube or passage C; see Fig. 1.

The filtering material it will be seen by referring to Fig. 1 is below the bottom of the cistern A. The water passes into the cistern A which is the reservoir for holding the impure or unfiltered water and the gate or valve I, being opened, said water will by its own gravity pass down the tube or passage C, up through the screen F and filtering materials F, H, into the well or vessel B, the water in the two vessels being of course at the same height. The well or vessel B therefore will contain pure or filtered water and the water may be withdrawn by a pump J, if the vessel or cisterns sunk in the ground or by a faucet K, if above ground.

When the filtering material becomes foul it is cleaned by closing the valve or gate I, inserting the pump J, in the tube D, and drawing thereby the water in B, through the filtering materials up through the tube D. This water may pass again into the vessel A, so that it will not be lost or wasted. The water in consequence of being forced or passed through the filtering material in a reverse direction will be cleansed or, if necessary new filtering materials may be placed within the well or vessel B, when deprived of water.

The flanch G, is to prevent the displacement of the charcoal F, by the water in passing up through it; charcoal being specifically lighter than water is liable to be carried up along the smooth sides of the well or vessel B. This is prevented by the flanch G, which obstructs the upward passage of the charcoal.

If the cistern or vessel A is sunk in the ground the well or vessel should be sufficiently large in diameter so that a person may descend into it and remove the filtering materials when necessary. If the device is constructed on a small scale, the vessel B, may be made sufficiently large to admit the hand. When constructed on a small scale, the vessel A may be inclosed by a casing and a nonconducting material placed between so as to keep the water in a cool state.

I do not claim withdrawing the fluid in the opposite direction from that by which it entered, for the purpose of cleaning the material; nor do I claim combining two vessels so as to allow the fluid to descend from the one below the filtering materials, and thence upward through it, into the other vessel, irrespective of the method described.

Therefore what I do claim is—

1. Constructing the cistern, vessel, or reservoir A, with an inner well or vessel B, the lower part of which projects below the bottom of the cistern or vessel A, and is provided with any proper filtering material; the lower part of the well or vessel B, communicating with the lower part of the vessel A by a tube C, provided with a gate or valve I, and a suction tube D also communicating with the lower part of the well or vessel B, substantially as described for the purpose specified.

2. I claim the flanch G, attached to the inner side of the well or vessel B, between the layers F, H, of charcoal and sand substantially as shown for the purpose specified.

CHAPMAN WARNER.

Witnesses:
WILSON COBB,
BENJ. WARNER.